(12) United States Patent
Tingley

(10) Patent No.: US 7,258,246 B2
(45) Date of Patent: Aug. 21, 2007

(54) BAKING TRAY

(75) Inventor: Jason Tingley, Springfield, OH (US)

(73) Assignee: American Pan Company, Urbana, OH (US)

( * ) Notice: Subject to any disclaimer, the term of this patent is extended or adjusted under 35 U.S.C. 154(b) by 55 days.

(21) Appl. No.: 11/084,430

(22) Filed: Mar. 18, 2005

(65) Prior Publication Data

US 2005/0204932 A1  Sep. 22, 2005

Related U.S. Application Data

(60) Provisional application No. 60/554,770, filed on Mar. 19, 2004.

(51) Int. Cl.
*A47J 37/01* (2006.01)
*B65D 1/36* (2006.01)
*B65D 1/34* (2006.01)
*B65D 1/44* (2006.01)

(52) U.S. Cl. .................. 220/507; 206/558; 206/564; 220/555; 220/573.1

(58) Field of Classification Search .............. 220/23.2, 220/23.4, 555–557, 537.1, 507; 206/557, 206/558, 561, 564
See application file for complete search history.

(56) References Cited

U.S. PATENT DOCUMENTS

| | | | |
|---|---|---|---|
| 780,253 A * | 1/1905 | Ycre ......................... 425/308 |
| 1,671,450 A * | 5/1928 | Ross ........................... 99/447 |
| 1,840,310 A | 1/1932 | Debs | |
| 2,305,014 A | 12/1942 | Langel | |
| 2,329,772 A | 9/1943 | Langel | |
| 3,296,956 A * | 1/1967 | Turner ........................ 99/439 |
| 3,590,728 A * | 7/1971 | Stanley ........................ 99/439 |
| 3,981,656 A * | 9/1976 | Steels et al. ................ 425/182 |
| 4,069,941 A * | 1/1978 | Popplewell et al. ....... 220/23.4 |
| 4,167,233 A * | 9/1979 | Hare ........................ 220/669 |
| 4,195,747 A * | 4/1980 | Hare ........................ 220/23.2 |
| 4,296,682 A * | 10/1981 | Thompson ................... 99/426 |
| 4,941,585 A | 7/1990 | Hare et al. | |
| 5,191,830 A * | 3/1993 | Jacobson ..................... 99/439 |
| 5,232,609 A * | 8/1993 | Badinier et al. ........... 249/102 |
| 5,487,330 A * | 1/1996 | Mooney ...................... 99/425 |
| 6,505,809 B1 * | 1/2003 | Reed .......................... 249/95 |

OTHER PUBLICATIONS

"International Search Report and Written Opinion" in PCT/US2005/009178, filed Mar. 18, 2005.

* cited by examiner

*Primary Examiner*—Anthony D. Stashick
*Assistant Examiner*—Niki M. Eloshway
(74) *Attorney, Agent, or Firm*—McNees Wallace & Nurick LLC

(57) ABSTRACT

A tray for use in baking bread, baguettes, crusty rolls, or the like comprising a contoured baking sheet fabricated from a single piece of material and at least one support member attached to the baking sheet. The support member includes a plurality of protrusions that correspond to a series of fastening apertures formed in the baking sheet. Pressure applied to the protrusions deforms the top portion thereof and creates a series of permanent connectors that connect the support member to the baking sheet to form a baking tray.

12 Claims, 4 Drawing Sheets

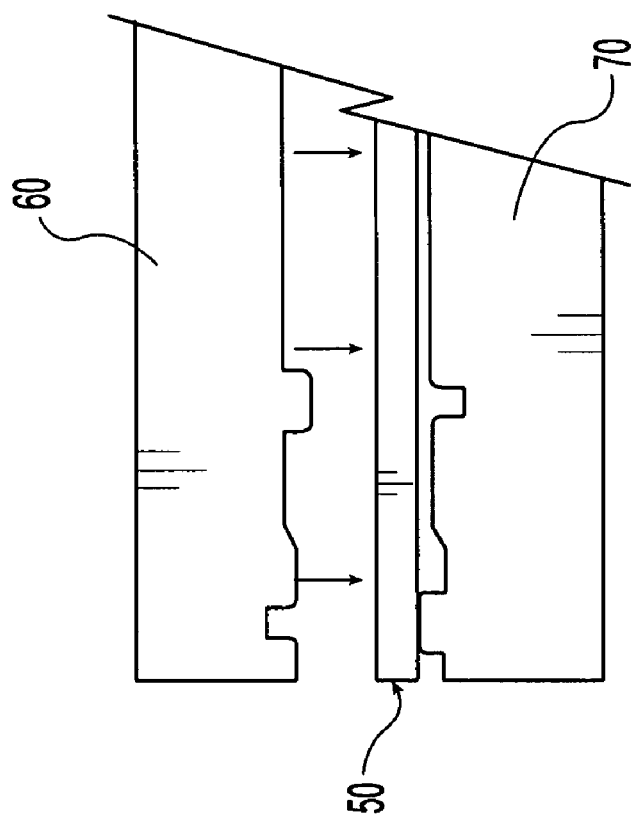
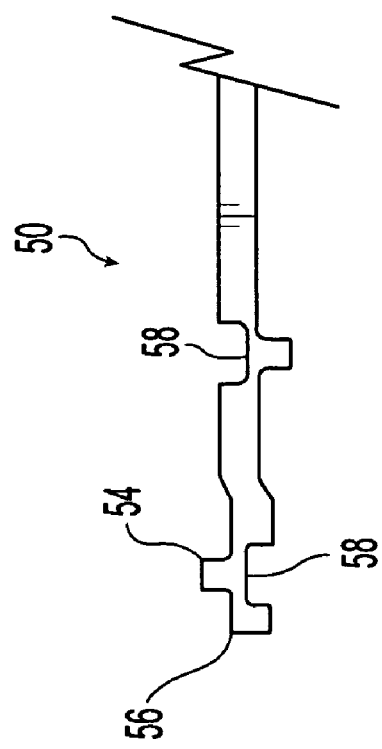

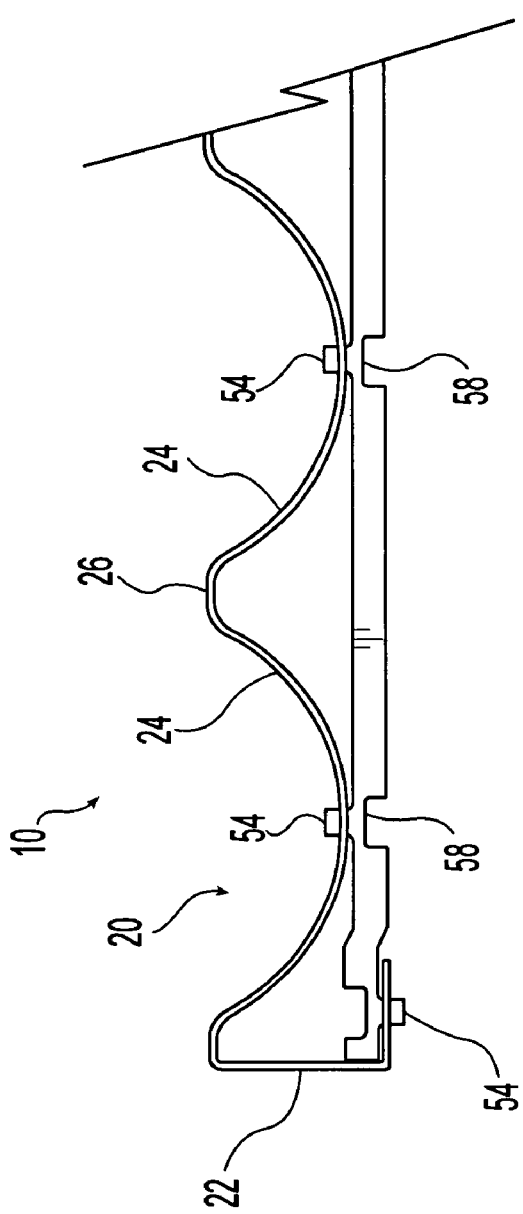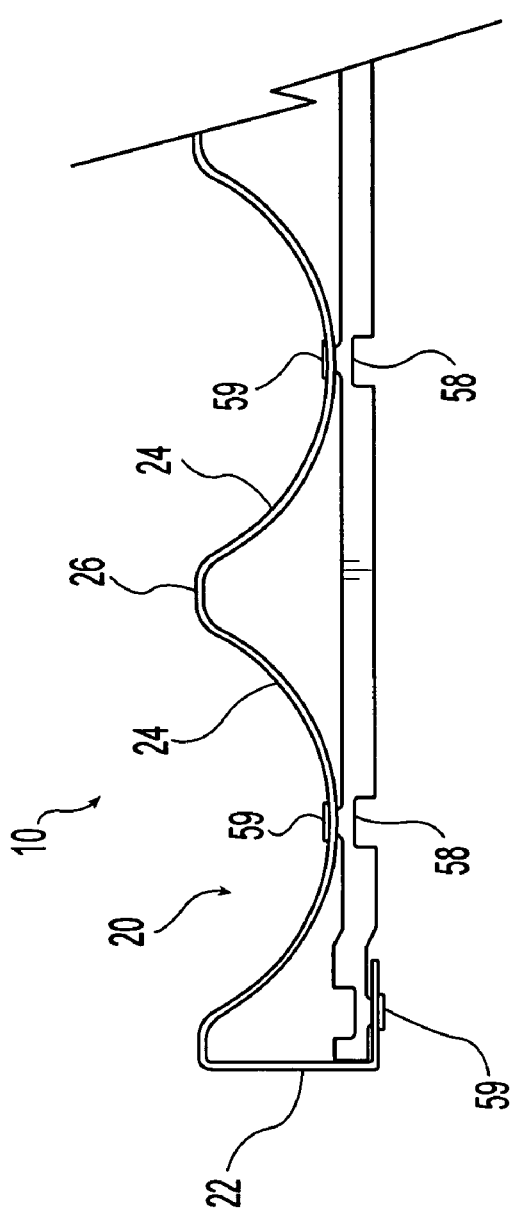

BAKING TRAY

CROSS-REFERENCE TO RELATED APPLICATIONS

This patent application claims the benefit of U.S. Provisional Patent Application Ser. No. 60/554,770 filed on Mar. 19, 2004 and entitled "Baguette Baking Pan System," the disclosure of which is incorporated by reference as if fully rewritten herein.

TECHNICAL FIELD OF THE INVENTION

This invention relates generally to devices used in the production of bread and other baked goods, and specifically to a reinforced baking pan for use in high-volume commercial production of baguettes, crusty rolls, and the like.

BACKGROUND OF THE INVENTION

The commercial production of bread products such as baguettes and crusty rolls typically includes the use of a baking pan or tray. Such pans or trays may include a baking sheet that further includes a plurality baking subunits formed in the baking sheet. These subunits roughly determine the shape and overall length of the baked loaf or roll. Due to its high thermal conductivity, low density, and good corrosion resistance, baking sheets of this nature are typically manufactured from aluminum; however, stainless steel may also be used. To provide or enhance structural integrity, the baking sheet may be attached to a frame either by welding, riveting, or a similar known means for joining components together.

Welding and riveting operations are often expensive and add to the overall cost associated with manufacturing baking trays. Additionally, commercial baking trays that are constructed from multiple components that have been riveted or welded together tend to suffer from significant structural deficiencies that negatively impact the function and longevity of the trays. With prolonged use and repeated exposure to mechanical stresses, rivets may loosen or break free from the pan. Likewise, welded baking pans that are subjected to repeated heating and cooling cycles are highly susceptible to fatigue cracking that destroys the weld joints and renders the tray useless for baking. Thus, there is a need for a relatively inexpensive means for manufacturing industrial baking trays that does not include the use of riveting or welding to attach the components of the tray to one another.

SUMMARY OF THE INVENTION

Deficiencies in and of the prior art are overcome by the present invention, which provides a reinforced baking tray and a method for assembling the baking tray. An exemplary embodiment of the baking tray includes a baking sheet formed from a single piece of material. The baking sheet further includes: (i) a plurality of baking subunits formed in the top surface of the sheet, wherein each of the baking subunits further comprises an aperture near the front edge of the baking sheet and an aperture near the rear edge of the baking sheet; (ii) a frame member formed at the right edge of the sheet running substantially parallel to the baking subunits, and that further includes an aperture near the front edge of the baking sheet and an aperture near the rear edge of the baking sheet; and (iii) a frame member formed at the left edge of the sheet running substantially parallel to the baking subunits, and that further includes an aperture near the front edge of the baking sheet and an aperture near the rear edge of the baking sheet. At least one support member is attached to and extends between the right and left frame members and further includes a plurality of extruded portions. The support member is attached to the baking sheet by inserting the extruded portions of the support member into the apertures in the baking sheet and applying pressure or force to the extruded portions, wherein the pressure sufficient to deform the top of each extruded portion and form a connection between the support member and the baking sheet.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description of the preferred embodiments given below, serve to explain the principles of the invention.

FIGS. 3A and 3B are schematic representations of the exemplary method by which the extruded portions are created on the support member.

FIGS. 4A and 4B are front views of an exemplary embodiment of the present invention showing the baking sheet and support member prior to the deformation of the extruded portions and after deformation of the extruded portions.

DETAILED DESCRIPTION OF THE INVENTION

The present invention relates to a device for use in baking bread, baguettes, crusty rolls, or the like. According to a first general aspect of this invention a durable, reinforced baking tray is provided. An exemplary embodiment of this baking tray includes: (i) a single-piece contoured baking sheet that has been fabricated to provide a plurality of parallel baking subunits and two frame members on either side of and running parallel to the baking subunits; and (ii) at least one, and typically two or more, transverse support members, cross-bars, or rails that are attached to the frame members on the bottom or underside of baking sheet. Each support rail further includes a plurality of protrusions formed at regular intervals along the length of the rail, and these protrusions correspond to a plurality of fastening apertures formed in the baking sheet. The protrusions and the apertures cooperate to provide the means by which the support rails are attached to the baking sheet. According to a second general aspect of this invention, a method for assembling the baking tray is provided. An example of this method includes the steps of: (i) inserting the protrusions on the support member into and through the fastening apertures in the baking sheet; and (ii) applying pressure to deform the top portion of the protrusions to form a series of permanent connections between the support member and the baking sheet. Thus, assembly of the baking tray of the present invention does not involve the use of separate, individual fasteners, nor does it involve the use of welding. Consequently, this baking tray is more durable and less expensive to assemble than other trays used for similar purposes.

Figure 1:
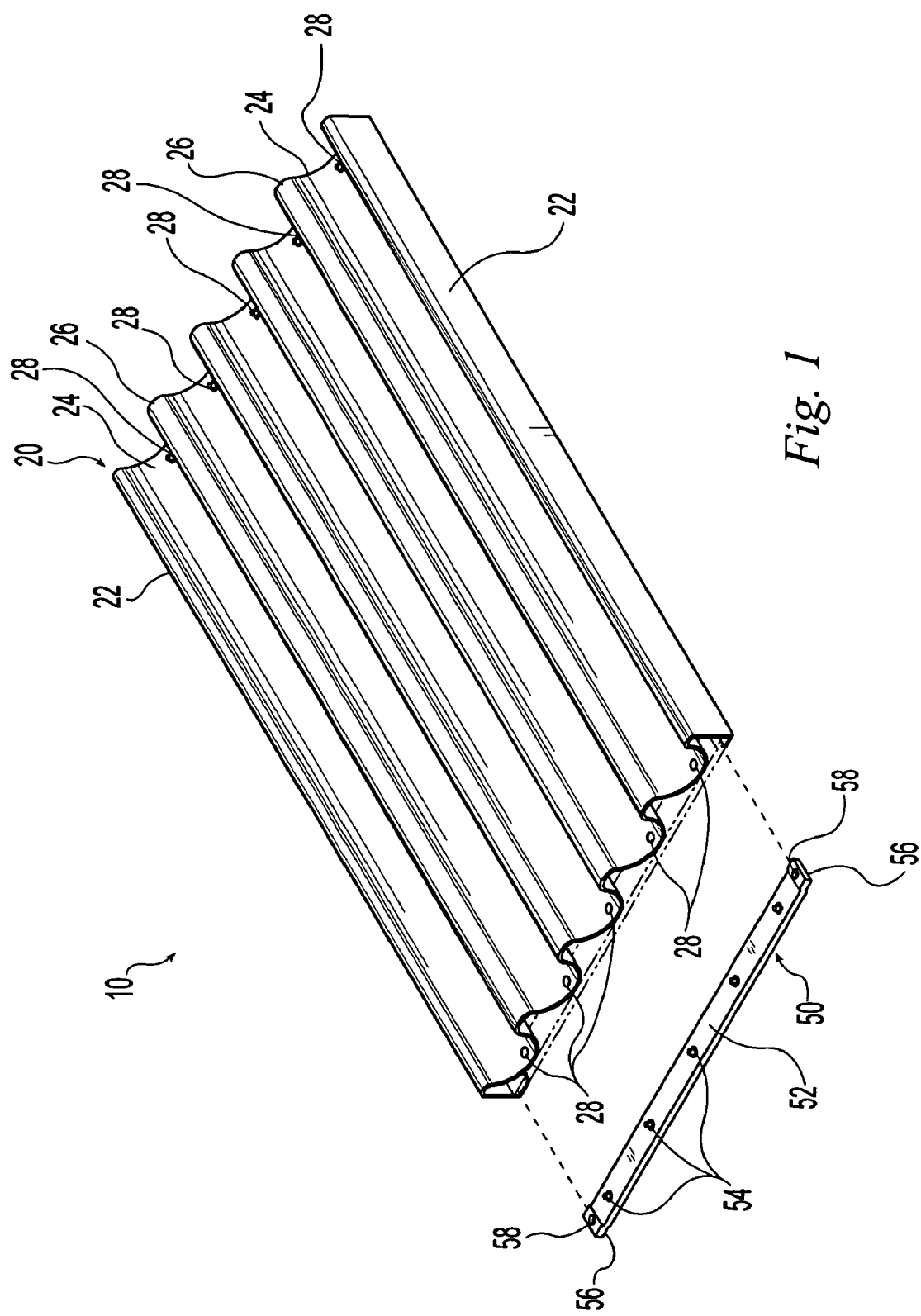
FIG. 1 is a top, front perspective view of an exemplary embodiment of the baking tray of the present invention.
Figure 2:
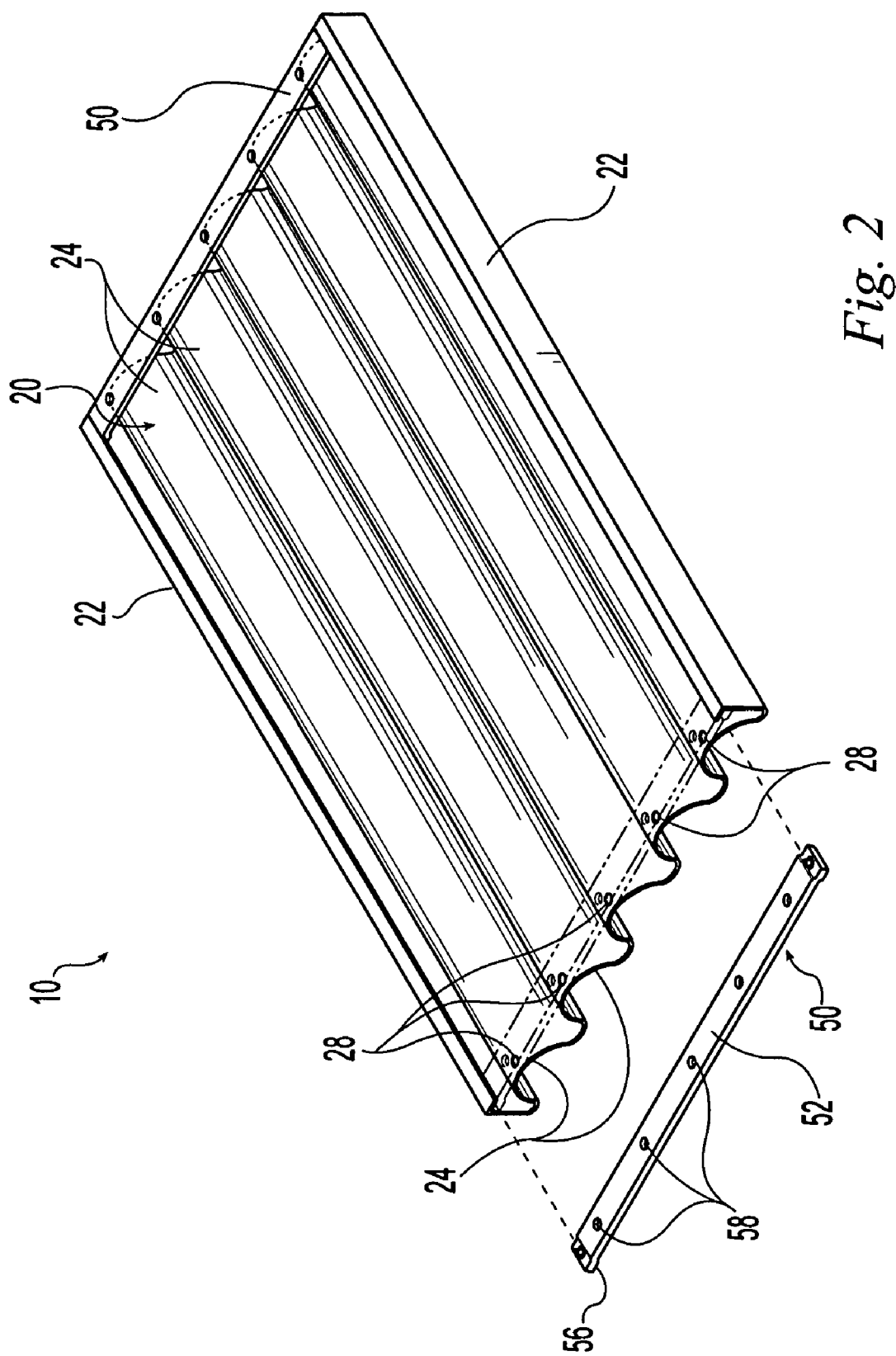
FIG. 2 is a bottom, front perspective view of an exemplary embodiment of the baking tray of the present invention.

With reference now to the Figures, FIGS. 1-2 provide top and bottom, front perspective views of an exemplary embodiment of baking tray 10. This embodiment of baking tray 10 further includes a baking sheet 20, which is formed from a single piece of metal. Baking sheet 20 includes a plurality of substantially parallel baking subunits or troughs 24 formed in the top surface of the sheet, and each trough 24 further includes at least one fastening aperture 28 near the front edge of the baking sheet and at least one fastening aperture 28 near the rear edge of the baking sheet. At both the left and right sides of baking sheet 20, the material from which the sheet is made has been shaped, i.e., bent (see FIGS. 4A and 4B) to form a frame member 22. Frame members 22 run substantially parallel to the baking subunits, and each frame member 22 further comprises at least one fastening aperture near the front edge of the baking sheet and at least one fastening aperture near the rear edge of the baking sheet.

Baking sheet 20 may be manufactured from metal, such as stainless steel, carbon steel, or aluminum, or from other material suitable for the baking process, and may be formed by known press working methods or other methods to produce the general shape shown in the Figures. In some embodiments, baking sheet 20 further includes a series of perforations formed in the surface of the sheet. Various patterns of perforations are possible, and the size of the perforations may vary between or within different embodiments. Although the exemplary embodiment shown in the Figures includes troughs 24, the surface of the baking sheet may be substantially flat or otherwise free of contoured portions. In embodiments that include a contoured baking surface, various shapes and sizes of baking subunits are possible and are typically determined by the items being baked and on the production capacities or other characteristics of the particular baking process being used.

In the exemplary embodiment, attaching baking sheet 20 to support member 50 includes the use of a plurality of fastening apertures 28 that are formed in the surface of baking sheet 20. In the exemplary embodiment, these apertures are about 0.005 inch (0.013 cm) larger in diameter than the corresponding protrusions 54 (see FIGS. 4A-B). Thus, in the exemplary embodiment, fastening apertures 28 are 0.193 inches (0.49 cm) in diameter and protrusions 54 are 0.188 inches (0.48 cm) in diameter.

As best shown in FIGS. 1-2, at least one, and typically two, support members 50 extend between the right and left frame members, each further including a plurality of extruded portions or protrusions 54. For purposes of attaching each support member 50 to baking sheet 20, the protrusions 54 that are formed on surface 52 are oriented opposite to the protrusions formed on end portion 56. A plurality of indents 58 are formed on support member 50 opposite each protrusion 54 as a result of the extrusion process (described below). In the assembled version of baking tray 10, support members 50 are attached to baking sheet 20 by inserting the protrusions 54 on support members 50 into the apertures 28 on the front edge of the baking sheet and the apertures 28 on the back edge of baking sheet 20 and applying mechanical pressure to the protrusions 54, wherein the pressure is sufficient to deform the top of each protrusion and form a connector 59 between the support member and the baking sheet.

In the exemplary embodiment, support members 50 are manufactured from 6063 aluminum stock. This alloy is generally compatible with this and other embodiments of this invention due to its relatively low cost, good formability, and desirable strength to weight ratio. This highly ductile material is also suitable for the baking environment and contact with food. The overall dimensions of cross bar 50 will vary based on the characteristics of the tray in question. In the exemplary embodiment shown in the Figures, support member 50 is 0.25 inches (0.64 cm) in height and 0.75 inches (1.91 cm) in width. This thickness permits minimal material usage during the extrusion process while still providing a high level of strength by permitting the formation of protrusions of sufficient height and diameter.

The size, number and location of protrusions 54 that are formed on support member 50 are determined by the design qualities and physical characteristics of the tray to which it is to be attached. The 0.188 inch (0.48 cm) diameter used in the exemplary embodiment is adequate for providing sufficient attachment strength for this embodiment. As shown in FIGS. 3A-B, protrusions 54 may be formed by a cold extrusion process, wherein an extrusion punch 60 positioned opposite of each desired protrusion displaces material into the extrusion die 70 and forms protrusions 54. Advantageously, all of the protrusions 54 on any given support member 50 may be formed in a single press stroke.

As shown in FIGS. 4A-B, support member 50 is attached, i.e., "clinched" to baking sheet 20 by inserting protrusions 54 into apertures 28 and applying pressure or force to the protrusions, wherein the pressure is sufficient to deform the top of each protrusion and form a durable connection between the support member and the baking sheet. Clinching deforms the top portion of each protrusion 54 into a head larger than the diameter of the original protrusion 54 and fastening aperture 28. In this embodiment, connector 59 permanently attaches the support member 50 to the baking sheet 20. Although the exemplary embodiment shown in the Figures includes two support members, additional support members may be attached to baking tray 10 at different positions on the tray using the described methodology.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A baking pan, comprising:
    (a) a unitary baking sheet, wherein the baking sheet further includes:
        (i) a front edge;
        (ii) a rear edge;
        (iii) a plurality of elongated baking subunits extending lengthwise from the front edge to the rear edge of the baking sheet, wherein each baking subunit is substantially parallel to at least one of the other baking subunits, and wherein each baking unit further comprises at least one fastening aperture formed therein near the front edge of the baking sheet and at least one fastening aperture formed therein near the rear edge of the baking sheet;

(iv) a first frame member formed lengthwise along one side of the baking sheet, wherein the first frame member includes at least one fastening aperture formed therein near the front edge of the baking sheet and at least one fastening aperture formed therein near the rear edge of the baking sheet; and (v) a second frame member formed lengthwise along the opposite side of the baking sheet, wherein the second frame member includes at least one fastening aperture formed therein near the front edge of the baking sheet and at least one fastening aperture formed therein near the rear edge of the baking sheet; and (b) a first transverse support member adapted to be attached to the front edge of the baking sheet, wherein the first transverse support member further includes:

(i) a first end section, wherein the first end section further includes at least one downwardly facing protrusion;

(ii) a second end section, wherein the second end section further includes at least one downwardly facing protrusion; and (iii) a middle section between the end sections, wherein the middle section further includes a plurality of upwardly facing protrusions; and (c) a second transverse support member adapted to be attached to the rear edge of the baking sheet, wherein the second transverse support member further includes:

(i) a first end section, wherein the first end section further includes at least one downwardly facing protrusion;

(ii) a second end section, wherein the second end section further includes at least one downwardly facing protrusion; and (iii) a middle section between the end sections, wherein the middle section further includes a plurality of upwardly facing protrusions; and (d) wherein the first transverse support member is attached to the front edge of the baking sheet by inserting the downwardly facing protrusions into the fastening apertures formed in the first and second frame members near the front edge of the baking sheet, inserting the upwardly facing protrusions into the fastening apertures formed in each of the baking subunits near the front edge of the baking sheet, and applying force to each protrusion sufficient to deform a portion thereof against the baking sheet; and (e) wherein the second transverse support member is attached to the rear edge of the baking sheet by inserting the downwardly facing protrusions into the fastening apertures formed in the first and second frame members near the rear edge of the baking sheet, inserting the upwardly facing protrusions into the fastening apertures formed in each of the baking subunits near the rear edge of the baking sheet, and applying force to each protrusion sufficient to deform a portion thereof against the baking sheet.

2. The baking pan of claim 1, wherein each of the baking subunits is a U-shaped trough.

3. The baking pan of claim 1, wherein each of the baking subunits further comprises a plurality of perforations formed therein.

4. The baking pan of claim 1, wherein the protrusions on the transverse support members are formed by the process of extrusion.

5. The baking pan of claim 1, wherein the baking sheet is manufactured from stainless steel, carbon steel, or aluminum.

6. The baking pan of claim 1, wherein the transverse support members are manufactured from aluminum.

7. A method for making a baking pan, comprising:

(a) providing a unitary baking sheet, wherein the baking sheet further includes:

(i) a front edge;

(ii) a rear edge;

(iii) a plurality of elongated baking subunits extending lengthwise from the front edge to the rear edge of the baking sheet, wherein each baking subunit is substantially parallel to at least one of the other baking subunits, and wherein each baking unit further comprises at least one fastening aperture formed therein near the front edge of the baking sheet and at least one fastening aperture formed therein near the rear edge of the baking sheet;

(iv) a first frame member formed lengthwise along one side of the baking sheet, wherein the first frame member includes at least one fastening aperture formed therein near the front edge of the baking sheet and at least one fastening aperture formed therein near the rear edge of the baking sheet; and (v) a second frame member formed lengthwise along the opposite side of the baking sheet, wherein the second frame member includes at least one fastening aperture formed therein near the front edge of the baking sheet and at least one fastening aperture formed therein near the rear edge of the baking sheet; and (b) providing a first transverse support member adapted to be attached to the front edge of the baking sheet, wherein the first transverse support member further includes:

(i) a first end section, wherein the first end section further includes at least one downwardly facing protrusion;

(ii) a second end section, wherein the second end section further includes at least one downwardly facing protrusion; and (iii) a middle section between the end sections, wherein the middle section further includes a plurality of upwardly facing protrusions; and (c) providing a second transverse support member adapted to be attached to the rear edge of the baking sheet, wherein the second transverse support member further includes:

(i) a first end section, wherein the first end section further includes at least one downwardly facing protrusion;

(ii) a second end section, wherein the second end section further includes at least one downwardly facing protrusion; and (iii) a middle section between the end sections, wherein the middle section further includes a plurality of upwardly facing protrusions; and (d) attaching the first transverse support member to the front edge of the baking sheet by inserting the downwardly facing protrusions into the fastening apertures formed in the first and second frame members near the front edge of the baking sheet, inserting the upwardly facing protrusions into the fastening apertures formed in each of the baking subunits near the front edge of the baking sheet, and applying force to each protrusion sufficient to deform a portion thereof against the baking sheet; and (e) attaching the second transverse support member to the rear edge of the baking sheet by inserting the downwardly facing protrusions into the fastening apertures formed in the first and second frame members near the rear edge of the baking sheet, inserting the upwardly facing protrusions into the fastening apertures formed in each of the baking subunits near the rear edge of the baking sheet, and applying force to each protrusion sufficient to deform a portion thereof against the baking sheet.

8. The method of claim 7, wherein each of the baking subunits is a U-shaped trough.

9. The method of claim 7, wherein each of the baking subunits further comprises a plurality of perforations formed therein.

10. The method of claim 7, wherein the protrusions on the transverse support members are formed by the process of extrusion.

11. The method of claim 7, wherein the baking sheet is manufactured from stainless steel, carbon steel, or aluminum.

12. The method of claim 7, wherein the transverse support members are manufactured from aluminum.

* * * * *